(12) United States Patent
Suzuki et al.

(10) Patent No.: US 7,399,524 B2
(45) Date of Patent: Jul. 15, 2008

(54) PLASTIC OPTICAL ELEMENTS

(75) Inventors: Fumiyuki Suzuki, Kanagawa (JP); Tadashi Mochizuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 132 days.

(21) Appl. No.: 10/859,139

(22) Filed: Jun. 3, 2004

(65) Prior Publication Data
US 2004/0247901 A1 Dec. 9, 2004

(30) Foreign Application Priority Data

Jun. 5, 2003 (JP) .............................. 2003-160907

(51) Int. Cl.
*G02B 1/10* (2006.01)
*B32B 27/32* (2006.01)
*B32B 27/36* (2006.01)

(52) U.S. Cl. ........................ 428/336; 428/412; 428/451

(58) Field of Classification Search .................. 428/451, 428/336
See application file for complete search history.

(56) References Cited

U.S. PATENT DOCUMENTS 5,681,666 A * 10/1997 Treger et al. .................. 429/90
5,770,301 A * 6/1998 Murai et al. ................. 428/213
5,783,299 A * 7/1998 Miyashita et al. ........... 428/329
6,528,672 B2 * 3/2003 Yamaguchi et al. ......... 556/419
6,582,823 B1 * 6/2003 Sakhrani et al. ............. 428/412
2003/0207050 A1 * 11/2003 Hay et al. .................... 428/1.6

FOREIGN PATENT DOCUMENTS

JP 2002-148402 A 5/2002

\* cited by examiner

*Primary Examiner*—D. S. Nakarani
(74) *Attorney, Agent, or Firm*—Sughrue Mion, PLLC

(57) ABSTRACT

The plastic optical element has such a characteristic that it will gain a mass increase of no more than 0.1 mass % upon moisture absorption when it is left to stand for 30 days in an atmosphere with a temperature of 40° C. and a relative humidity of 20% and then left to stand for an additional 30 days in an atmosphere with a temperature of 40° C. and a relative humidity of 90%. The plastic optical element includes a plastic substrate and a multi-layered film covering the plastic substrate. The multi-layered film includes a lower inorganic layer formed over the plastic substrate and an upper organic layer formed over the inorganic layer.

15 Claims, 1 Drawing Sheet

PLASTIC OPTICAL ELEMENTS

BACKGROUND OF THE INVENTION

This invention relates to the technical field of optical elements such as lens and prism and, more particularly, to plastic optical elements that undergo extremely small changes in characteristics upon absorbing moisture (water).

Conventionally, optical elements such as camera lens or viewfinders, various other kinds of lenses and prisms that are employed in copying equipments, printers, projectors and optical communications, as well as optical elements including eyeglass lens, contact lens and magnifier are in most cases manufactured from glass. However, with recent advances in the plastic forming technology, it has become popular to manufacture lenses and prisms from plastics that can be mass-produced from inexpensive starting materials and which are lightweight.

However, plastics have the disadvantage that their refractive indices and shapes will change upon moisture absorption. Because of these constraints, plastics are not suitable for use as the material of optical elements that require high precision, an example of which is a lens in a high-quality single-lens reflex camera.

With a view to solving this problem, attempts have been made to develop plastic materials having high moisture-proof quality (absorbing less moisture) through polymer structure design and other strategies; however, the kinds of promising plastic materials are so few that the degree of freedom in the design of optical elements is quite limited in various terms including cost. It is known to coat a surface of an anti-reflective layer of optical parts with a different material than the anti-reflective layer to a thickness of 0.5-20 nm and apply a water- and oil-repelling treatment on the anti-reflective layer (JP 2002-148402 A).

However, what is applied in this treatment is a single-layered coat of a silane coupling agent and it has no ability to prevent moisture absorption although it can repel water. In order to make plastic optical elements having moisture-proof quality, it is often attempted to add hydrophobic substances into the optical element as it is being molded or else, or cover the molded optical element with a barrier film impermeable to moisture. However, these methods are still incapable of producing plastic optical elements having adequate moisture-proof quality.

SUMMARY OF THE INVENTION

The present invention has been accomplished under these circumstances and has as an object providing plastic optical elements that are lightweight, cost-effective and economically mass-producible, that have such high moisture-proof quality that they undergo extremely small changes in optical characteristics even if they are exposed to the environmental water, and that offer ease in manufacturing a plurality of optical elements having different optical characteristics.

The present inventors made by intensive studies in order to attain the stated object. As a result, they found that the object could be attained by a plastic optical element having such a characteristic that it would gain a mass increase of no more than 0.1 mass % upon moisture absorption when it was left to stand for 30 days in an atmosphere with a temperature of 40° C. and a relative humidity of 20% and then left to stand for an additional 30 days in an atmosphere with a temperature of 40° C. and a relative humidity of 90%. Such a plastic optical element had sufficiently high moisture-proof quality that it underwent extremely small changes in optical characteristics even when it was exposed to the environmental water. One method for providing this feature is by covering the surface of the plastic optical element with a multi-layered film comprising a lower inorganic layer and an upper organic layer. That is to say, this feature is realized by the plastic optical element the surface of which is covered with the multi-layered film.

More particularly, it is preferable that the lower inorganic layer contains as a main component at least one selected from the group consisting of $SiO_2$, $SiO$, $ZrO_2$, $TiO_2$, $TiO$, $Ti_2O_3$, $Al_2O_3$, $Ta_2O_5$, $CeO_2$, $MgO$, $Y_2O_3$, $SnO_2$, $MgF_2$, $WO_3$, mixed oxides of In and Sn, and mixture thereof.

Preferably, the lower inorganic layer contains silicon oxide as a main component, and a thickness of the lower inorganic ranges from 50 nm to 1000 nm.

It is preferable that the upper organic layer contains as a main component at least one selected from the group consisting of poly(vinylidene chloride), copolymers of vinylidene chloride and vinyl chloride, cycloolefinic resin, amorphous fluoro-resin, fluoro-resin, silicone resin and mixture thereof.

Preferably, the upper organic layer contains as a main component at least one selected from the group consisting of poly(vinylidene) chloride, fluorine-containing resin, silicon-containing resin and mixture thereof, and a thickness of the upper organic ranges from 200 nm to 1000 nm.

It is preferable that the plastic substrate contains as a main component at least one selected from the group consisting of methacrylic resin, acrylic resin, polycarbonate resin, aromatic polyester resin, polystyrene resin, acrylonitrile/styrene resin, tricyclodecane ring-containing resin, cycloolefin polymer, poly(methylpentene), styrene/butadiene copolymer, fluorene group-containing polyester, cycloolefinic resin, and mixture thereof.

Preferably, the plastic substrate contains as a main component at least two materials having different dispersion characteristics, and the at least two materials having the different dispersion characteristics contain Cycloolefinic resin which undergoes small change in refractive index upon moisture absorption and which also suffers only limited optical distortion and polycarbonate resin or aromatic polyester resin.

It is further preferable that the plastic optical element comprises an anchor coat formed between the lower inorganic layer and the upper organic layer.

It is further preferable that the plastic optical element comprises at least one selected from the group consisting of an index adjusting coat, an anti-reflection film and an adhesion improving coat provided between the plastic substrate 12 and the multi-layered film.

Moreover, it is further preferable that the plastic optical element comprises at least one selected from the group consisting of an anti-reflection film, an index adjusting coat, an adhesion improving coat and a damage preventing barrier film with which the multi-layered film is covered.

DESCRIPTION OF THE PREFERRED EMBODIMENT

Figure 1:
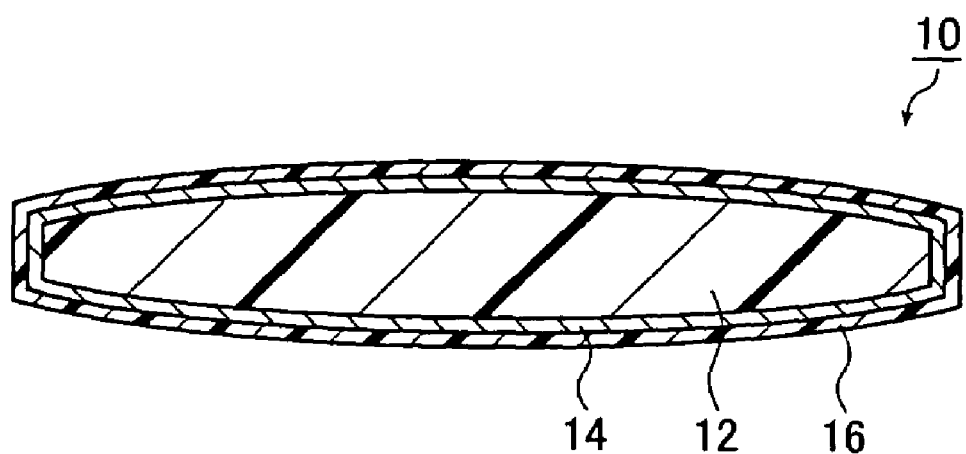
FIG. 1 shows in concept an example of the plastic optical element of the invention.

The plastic optical element of the invention is described below with reference to the preferred embodiment shown in the accompanying drawing.

FIG. 1 shows in concept an example of the plastic optical element of the invention.

The plastic optical element generally indicated as 10 in FIG. 1 (hereunder referred to simply as the optical element 10) embodies the present invention in the form of a lens. As such, it comprises an optical element's substrate 12 (hereunder referred to as the substrate 12), an inorganic layer 14 formed on top of the substrate 12, and an organic layer 16 formed on top of the inorganic layer 14.

The use of the plastic optical element of the invention is not limited to the illustrated case of a lens. It can also be used as various members or parts such as a prism, an optical filter, an optical screen, a deflector, a polarizer, a light reflector and various other members that exhibit optical functions either as incorporated or independently in imaging optics of imaging apparatuses including cameras (e.g. silver halide camera, digital camera and video camera) and viewfinders, image forming apparatuses (e.g. copier and printer), projectors, eyeglasses and contact lenses, telescopes, binoculars, magnifiers, etc.

As already mentioned, the illustrated optical element 10 embodies the present invention as it is applied to a lens and the substrate 12 is an ordinary plastic lens.

In the present invention, the substrate 12 is not limited in any particular way and various other optical element's substrates (i.e. known optical elements) that can be processed to prepare the aforementioned variety of optical elements may be employed as long as they are made of plastics.

The material of which the substrate 12 is formed is not limited to any particular type and various plastic materials (resin materials) used in ordinary optical elements (parts) may be employed. Examples include methacrylic resins (e.g. PMMA), acrylic resins, polycarbonate resins, aromatic polyester resins, polystyrene resins, acrylonitrile/styrene (AS) resins, tricyclodecane ring-containing resins, cycloolefin polymers, poly(methylpentene), styrene/butadiene copolymers, fluorene group-containing polyesters, and cycloolefinic resins.

In particular, in order to provide an imaging optical system with achromatism, at least two materials having different dispersion characteristics are required. Cycloolefinic resins which undergo small change in refractive index upon moisture absorption and which also suffer only limited optical distortion may be a candidate for one of the two materials. Such cycloolefinic resins have Abbe numbers of about 55 and for optical design purposes, they can advantageously be combined with polycarbonate resins and aromatic polyester resins which have Abbe numbers of about 30.

In addition, the method of forming the substrate 12 is not limited in any particular way and all known plastics shaping methods including injection molding, injection compression molding and compression molding can be employed as appropriate for the plastic material that is to be used.

In the illustrated optical element 10, the entire surface of the substrate 12 is covered with the inorganic layer 14 which, in turn, is covered across with the organic layer 16. Thus, the optical element 10 is of such a design that the entire surface of the substrate 12 is covered with a multi-layered film comprising the lower inorganic layer 14 and the upper organic layer 16.

The multi-layered film comprising the inorganic layer 14 and the organic layer 16 provides a very effective moisture barrier.

Hence, the optical element 10 of the invention which has the entire surface of the substrate 12 covered with that multi-layered film exhibits outstanding moisture-proof quality (humidity resistance or ability to withstand moisture absorption), so even if it is exposed to a humid environment, it does not absorb moisture and will undergo extremely small changes in characteristics in the presence of the environmental water. What is more, the substrate 12 is covered with the multi-layered film, so as long as film formation is possible, various materials (plastic materials) for the substrate 12 that have different optical characteristics can be processed to provide optical elements 10 that not only retain their inherent optical characteristics but also exhibit high moisture-proof quality. For instance, the optical element of the invention may be applied to lens making and lenses of different optical characteristics may be combined to provide a precise imaging optical system that has high moisture-proof quality and which is free from chromatic aberration and other defects.

It is not known definitely why the use of the multi-layered film comprising the inorganic layer 14 and the organic layer 16 contributes to exhibiting superior moisture-proof quality. Most probably, the two layers which are deposited by different principles of film formation and have different layer arrangements are such that one layer makes up for, fills or complements the defect or drawback of the other layer, vice versa, while, at the same time, their inherent moisture-proof performance combine in a synergistic way, eventually ensuring superb humidity resistance.

Generally speaking, the inorganic layer 14 forms a hard coat involving a lot of pinholes, cracks and other surface defects. On the other hand, the organic layer 16 has a certain degree of elasticity. Thus, according to the present invention in which the underlying inorganic layer 14 is covered with the upper organic layer 16, pinholes and other surface defects in the inorganic layer 14 are advantageously filled with the organic layer 16 to eventually form a flawless coat which exhibits superb moisture-proof performance by ensuring that the moisture-proof performance of the inorganic layer 14 is exhibited to the fullest extent. What is more, the elastic organic layer 16 works as a film that protects the inorganic layer 14 not only by resisting external stress but also by acting against thermal and otherwise expansion or shrinkage of the substrate 12. As a result, strength is fully assured and satisfactory moisture resistance is exhibited over a prolonged period.

In the optical element 10 of the invention, the inorganic layer 14 is not limited in any particular way and various thin films based on inorganic materials can be employed as long as they are fully transparent but impervious to moisture.

Advantageous examples include $SiO_2$, $SiO$, $ZrO_2$, $TiO_2$, $TiO$, $Ti_2O_3$, $Al_2O_3$, $Ta_2O_5$, $CeO_2$, $MgO$, $Y_2O_3$, $SnO_2$, $MgF_2$, $WO_3$ and mixed oxides of In and Sn.

Whichever material it is made of, the inorganic layer 14 should preferably have the densest structure and absorb less of the light rays at the wavelength of interest.

The thickness of the inorganic layer 14 also is not limited in any particular way and may be chosen as appropriate for its composition and a particular combination with the organic layer 16, so it can be set at a thickness that assures the required transparency and exhibits the desired moisture-proof performance.

According to the study by the present inventors, it is generally preferred to set the thickness of the inorganic layer 14 between 50 nm and 1000 nm because within this range the inorganic layer 14 does not have many pinholes that affect moisture-proof performance. A thickness greater than 1000 nm makes no further corresponding contribution to moisture-proof quality.

The method of forming the inorganic layer 14 is not limited in any particular way and one can employ various dry film forming techniques such as vacuum evaporation, sputtering, ion plating and CVD (chemical vapor deposition), and various wet film forming techniques including the sol-gel process. A suitable method may be chosen considering the composition, thickness, etc. of the inorganic layer to be formed.

The method of applying coating solutions in the practice of the sol-gel process and other wet film forming techniques also is not limited in any particular way and various application methods may be employed, as exemplified by dip coating, spray coating and spin coating. Dip coating is preferred mainly because of the ease with which the inorganic layer 14 can be formed by applying the coating solution to the entire surface of the substrate 12.

When the sol-gel process is to be performed, the inorganic layer may typically be formed by hydrolyzing alkoxysilane compounds which are commercially available from various companies, for example, Nippon Dacro Shamrock Co., Ltd. under the trademark SolGard™.

In the optical element 10 of the invention, the organic layer 16 also is not limited in any particular way and various thin films based on organic materials can be employed as long as they are fully transparent but impervious to moisture.

Advantageous examples include layers based on poly(vinylidene chloride) and copolymers of vinylidene chloride and vinyl chloride, layers based on cycloolefinic resins as exemplified by ZEONEX™ of ZEON Corporation, layers based on amorphous fluoro-resins as exemplified by CYTOP™ of ASAHI GLASS CO., LTD. and Teflon™ AF of Du Pont, layers based on fluoro-resins as exemplified by Novec™ of Sumitomo 3M, Ltd., and layers based on silicone resins as exemplified by Shin-Etsu Silicone KR251, KR400 and KR114A of Shin-Etsu Chemical Co., Ltd.

The thickness of the organic layer 16 is not limited in any particular way and may be chosen as appropriate for its composition and a particular combination with the inorganic layer 14, so it can be set at a thickness that assures the required transparency and exhibits the desired moisture-proof performance.

According to the study by the present inventors, it is generally preferred to set the thickness of the organic layer 16 between 200 nm and 1000 nm because within this range the organic layer 16 does not have many pinholes that affect moisture-proof quality. A thickness greater than 1000 nm makes no corresponding further contribution to moisture-proof quality.

The organic layer 16 has preferably such optical characteristics that it permits good transmission of light rays and has low refractive index. With low refractive index, incident light suffers only small loss due to surface reflection, eventually leading to improved transmittance of light rays. By appropriate optical design, the moistureproof film according to the present invention can be provided with additional functions such as anti-reflection capability and service as a hard coat.

The method of forming the organic layer 16 is not limited in any particular way and one can employ various wet film forming techniques such as one in which the film-forming resin components are dissolved or dispersed to make coating solutions which are conditioned and subsequently applied and dried, as well as various dry film forming techniques including plasma-assisted polymerization and CVD. A suitable method may appropriately be chosen considering the composition, thickness, etc. of the organic layer to be formed.

In the wet film forming techniques which use coating solutions, the method of applying the coating solutions is not limited in any particular way and one may employ various techniques including spray coating, brush coating and dip coating. As in the case of the inorganic layer 14, dip coating is preferred mainly because of the ease with which the organic layer 16 can be formed by applying the coating solution to the entire surface of the substrate 12.

Prior to the formation of the organic layer 16, the surface of the inorganic layer 14 may optionally be covered with an anchor coat or otherwise treated to have better adhesion to the organic layer 16.

In the optical element 10 of the invention, the inorganic layer 14 and/or the organic layer 16 need not have a uniform thickness over the entire surface and as long as the desired moisture-proof quality is obtained, it basically suffices that optically working areas alone have a specified thickness that can realize the desired optical characteristics. Therefore, one may adopt such a design that the edges or end regions which do not participate in the transmission of light rays are thicker or thinner than the other areas.

What is more, even the optically working areas need not necessarily have a uniform thickness and they may have a certain degree of thickness distribution as long as the required optical characteristics can be realized.

As already mentioned, the optical element 10 of the invention has superior moisture-proof quality and even if it is left in a humid environment, it will experience extremely small changes in characteristics due to moisture absorption.

An advantageous case of the use of the present invention is its application to a lens element as shown in FIG. 1. To this end, the entire surface of the substrate 12 may be covered with the multi-layered film comprising the aforementioned inorganic layer 14 and organic layer 16. As a result, one can produce a lens element that has such a characteristic that it will gain a mass increase of no more than 0.1 mass % upon moisture absorption when it is left to stand for 30 days in an atmosphere with a temperature of 40° C. and a relative humidity of 20% and then left to stand for an additional 30 days in an atmosphere with a temperature of 40° C. and a relative humidity of 90%. Such an optical element has sufficiently high <moisture-proof quality> that it undergoes extremely small changes in optical characteristics such as focal position even when it is exposed to the environmental water.

While the plastic optical element of the invention has been described above in detail, the invention is by no means limited to the foregoing example and various improvements and modifications can of course be made without departing from the spirit and scope of the invention.

In the foregoing example, the substrate 12 is directly covered with the multi-layered film comprising the inorganic layer 14 and the organic layer 16. This is not the sole case of the invention and additional coats such as an index adjusting coat, an anti-reflection film and an adhesion improving coat may be provided between the substrate 12 and the multi-layered film. If desired, the multi-layered film may be covered with various films or coats such as an anti-reflection film, an index adjusting coat, an adhesion improving coat and a damage preventing barrier film. In short, as long as the entire surface of the substrate 12 is covered with the aforementioned multi-layered film, the plastic optical element of the invention may adopt layer arrangements incorporating various kinds of films or coats.

In the foregoing example, each of the inorganic layer 14 and the organic layer 16 is single-layered but this is not the sole case of the invention and the inorganic layer 14 and/or the organic layer 16 may optionally be composed of a multi-layered thin film.

The following specific examples are provided for further illustrating the present invention but are in no way to be taken as limiting.

Example 1

An injection molded polycarbonate convex lens was provided as an optical element's substrate 12; it had a lens diameter of 15 mm, a radius of 20 mm at each of the first and second surfaces and a center thickness of 2.5 mm.

A Si/O inorganic layer 14 was formed in a thickness of about 100 nm on the entire surface of the convex lens by sputtering. The sputtering target was a silicone plate and other conditions were as follows: gas supplied, $Ar/O_2=45/55$ (sccm); film forming pressure, 0.7 Pa; discharge power, 2 kW.

Then, a polyurethane-based anchor coat (product of Mitsui Takeda Chemicals, Inc.; prepolymer, Takelac A-310; curing agent, Takenate A-3) was applied to the surface of the inorganic layer 14 and dried; thereafter, using Saran Latex of ASAHI KASEI CORP., a poly(vinlylidene chloride) film was formed as an organic layer 16 in a thickness of about 800 nm. The anchor coat and the poly(vinlyidene chloride) film were formed by dip coating and subsequently drying at 70° C.

The obtained convex lens was aged for 3 days in an atmosphere of 35° C.×20% r.h. to prepare a convex lens as a version of the optical element of the invention in which the entire surface of the substrate 12 was covered with the multi-layered film comprising the inorganic layer 14 and the organic layer 16.

Example 2

A substrate identical to the substrate 12 employed in Example 1 was provided. The entire surface of the substrate was dip coated with SolGard primer of Nippon Dacro Shamrock Co., Ltd. and dried at 90° C. for 20 minutes to form a primer coat which in turn was dip coated with SolGard NP730. By subsequent curing at 120° C. for 1 hour, a Si/O inorganic layer 14 was formed in a thickness of about 300 nm (i.e., sol-gel process).

An organic layer 16 was formed on the surface of the inorganic layer 14 by applying a poly(vinylidene chloride) film in entirely the same manner as in Example 1; in this way, a convex lens was prepared as another version of the optical element of the invention in which the entire surface of the substrate 12 was covered with the multi-layered film comprising the inorganic layer 14 and the organic layer 16.

Example 3

The procedure of Example 2 was repeated except that the organic layer 16 was formed by replacing the poly(vinylidene chloride) film with a fluoro-resin based film having a thickness of about 1 μm. In this way, a convex lens was prepared as still another version of the optical element of the invention in which the entire surface of the substrate 12 was covered with the multi-layered film comprising the inorganic layer 14 and the organic layer 16.

It should be noted that the fluoro-resin based film was formed by first dip coating the entire surface of the inorganic layer 14 with Novec EGC-1700 of Sumitomo 3M, Ltd. and then drying the coat at 50° C.

Example 4

The procedure of Example 1 was repeated except that the organic layer 16 was formed by replacing the poly(vinylidene chloride) film with a fluoro-resin based film having a thickness of about 1 μm. In this way, a convex lens was prepared as yet another version of the optical element of the invention in which the entire surface of the substrate 12 was covered with the multi-layered film comprising the inorganic layer 14 and the organic layer 16.

It should be noted that the fluoro-resin based film was formed by first dip coating the entire surface of the inorganic layer 14 with CYTOP CTL-107M of ASAHI GLASS CO., LTD. and then drying the coat at 120° C. for 2 minutes.

Example 5

The procedure of Example 1 was repeated except that the substrate 12 was formed of O-PET of KANEBO, LTD. In this way, a convex lens was prepared as still another version of the optical element of the invention in which the entire surface of the substrate 12 was covered with the multi-layered film comprising the inorganic layer 14 and the organic layer 16.

Example 6

The procedure of Example 1 was repeated except that the substrate 12 was formed of VH-001 (PMMA) of Mitsubishi Rayon Co., Ltd. In this way, a convex lens was prepared as yet another version of the optical element of the invention in which the entire surface of the substrate 12 was covered with the multi-layered film comprising the inorganic layer 14 and the organic layer 16.

Comparative Example 1

A convex lens was prepared by repeating the procedure of Example 1, except that the organic layer 16 [poly(vinylidene chloride) film] was not formed.

Comparative Example 2

A convex lens was prepared by repeating the procedure of Example 1, except that the inorganic layer 14 (Si/O film) was not formed.

Comparative Example 3

A substrate identical to the substrate 12 used in Example 1 was provided. Then, a polyurethane-based anchor coat (product of Mitsui Takeda Chemicals, Inc.; prepolymer, Takelac A-310; curing agent, Takenate A-3) was applied to the surface of the substrate and dried; thereafter, using Saran Latex of ASAHI KASEI CORP., a poly(vinlylidene chloride) film was formed as an organic layer 16 in a thickness of about 800 nm. The anchor coat and the poly(vinlyidene chloride) film were formed by dip coating and subsequently drying at 70° C.

Then, an inorganic layer 14 was formed on the entire surface of the organic layer 16 in entirely the same manner as in Example 1, thereby preparing a convex lens having a multi-layered film comprising the lower organic layer 16 and the upper inorganic layer 14.

Comparative Example 4

A convex lens having a multi-layered film was prepared by repeating the procedure of Example 1, except that Saran Latex was used as a 20-fold dilution.

Comparative Example 5

A convex lens having a multi-layered film was prepared by repeating the procedure of Example 1, except that the sputtering period was shortened so that the thickness of the inorganic layer 14 was reduced to about 40 nm.

[Test on Moisture-Proof Quality]

Moisture-Proof Performance

The prepared convex lens elements were left for 30 days in an atmosphere with a temperature of 40° C. and a relative humidity of 20% (before evaluation of moisture-proof performance), then left for additional 30 days in an atmosphere with a temperature of 40° C. and a relative humidity of 90% and the resulting increase in the mass of each convex lens (after evaluation of moisture-proof performance) was taken as a substitute rating of moisture absorption. The results are shown below in Table 1.

Optical Performance

For the prepared convex lens elements, the focal position was determined both before and after the above-described evaluation of moisture-proof performance using paraxial parallel incident light (D-line). The focal positions (mm) of each convex lens before and after the evaluation of moisture-proof performance and the percent change in the focal position are also shown in Table 1.

TABLE 1

|  | Moisture-proof performance (wt % absorption) | Optical performance (focal position, mm) | | |
| --- | --- | --- | --- | --- |
|  |  | after drying | after moisture absorption | percent change |
| Ex. 1 | 0.04 | 25.40 | 25.35 | −0.0020 |
| Ex. 2 | 0.02 | 25.52 | 25.49 | −0.0011 |
| Ex. 3 | 0.03 | 25.61 | 25.57 | −0.0016 |
| Ex. 4 | 0.02 | 25.47 | 25.44 | −0.0012 |
| Ex. 5 | 0.06 | 23.68 | 23.61 | −0.0030 |
| Ex. 6 | 0.07 | 28.90 | 28.91 | −0.0030 |
| Comp. Ex. 1 | 0.39 | 25.43 | 24.88 | −0.0216 |
| Comp. Ex. 2 | 0.23 | 25.56 | 25.23 | −0.0129 |
| Comp. Ex. 3 | 0.11 | 25.48 | 25.33 | −0.0058 |
| Comp. Ex. 4 | 0.31 | 25.52 | 25.09 | −0.0168 |
| Comp. Ex. 5 | 0.35 | 25.57 | 25.52 | −0.0195 |

As is clear from the data shown in Table 1, the examples of the convex lens elements according to the invention in which the entire surface of the substrate 12 (convex lens) was covered with the multi-layered film comprising the lower inorganic layer 14 and the upper organic layer 16 were superior to the comparative examples (conventional convex lens elements) in that they experienced extremely small changes in the focal position after moisture absorption, namely, they had outstanding moisture-proof quality and experienced extremely small changes in characteristics due to the environmental water.

These are the definite advantages of the present invention.

As described in detail on the foregoing pages, the present invention provides plastic optical elements that are lightweight, cost-effective and economically mass-producible, that have such high moisture-proof quality that they undergo extremely small changes in optical characteristics in the presence of the environmental water, and which offer ease in manufacturing a plurality of optical elements having different optical characteristics.

What is claimed is:

1. A plastic optical element comprising:
   a plastic substrate; and
   a multi-layered film covering said plastic substrate, said multi-layered film comprising a lower inorganic layer formed over said plastic substrate and an upper organic layer formed over said inorganic layer,
   wherein said plastic substrate contains as a main component at least two materials having different Abbe numbers.

2. The plastic optical element according to claim 1, wherein said plastic optical element has such a characteristic that it will gain a mass increase of no more than 0.1 mass % upon moisture absorption when it is left to stand for 30 days in an atmosphere with a temperature of 40° C. and a relative humidity of 20% and then left to stand for an additional 30 days in an atmosphere with a temperature of 40° C. and a relative humidity of 90%.

3. The plastic optical element according to claim 1, wherein said lower inorganic layer contains as a main component at least one selected from the group consisting of $SiO_2$, $SiO$, $ZrO_2$, $TiO_2$, $TiO$, $Ti_2O_3$, $Al_2O_3$, $Ta_2O_5$, $CeO_2$, $MgO$, $Y_2O_3$, $SnO_2$, $MgF_2$, $WO_3$, mixed oxides of In and Sn, and mixture thereof.

4. The plastic optical element according to claim 1, wherein said lower inorganic layer contains silicon oxide as a main component.

5. The plastic optical element according to claim 1, wherein said upper organic layer contains as a main component at least one selected from the group consisting of poly (vinylidene chloride), copolymers of vinylidene chloride and vinyl chloride, cycloolefinic resin, amorphous fluoro-resin, fluoro-resin, silicone resin and mixture thereof.

6. The plastic optical element according to claim 1, wherein said upper organic layer contains as a main component at least one selected from the group consisting of poly (vinylidene) chloride, fluorine-containing resin, silicone resin and mixture thereof.

7. The plastic optical element according to claim 1, wherein a thickness of said upper organic layer ranges from 200 nm to 1000 nm.

8. The plastic optical element according to claim 7, wherein said at least two materials contain cycloolefinic resin which undergoes small change in refractive index upon moisture absorption and which also suffers only limited optical distortion and polycarbonate resin or aromatic polyester resin.

9. The plastic optical element according to claim 1, wherein said plastic substrate contains as a main component at least one selected from the group consisting of methacrylic resin, acrylic resin, polycarbonate resin, aromatic polyester resin, polystyrene resin, acrylonitrile/styrene resin, tricyclodecane ring-containing resin, cycloolefin polymer, poly(methylpentene), styrene/butadiene copolymer, fluorene group-containing polyester, cycloolefinic resin, and mixture thereof.

10. The plastic optical element according to claim 1, further comprising:
    at least one selected from the group consisting of an index adjusting coat, an anti-reflection film and an adhesion improving coat provided between said plastic substrate and said multi-layered film.

11. The plastic optical element according to claim 1, further comprising:
    at least one selected from the group consisting of an anti-reflection film, an index adjusting coat, an adhesion improving coat and a damage preventing barrier film with which said multi-layered film is covered.

12. The plastic optical element according to claim 1, wherein said at least two materials contain cycloolefinic resin which undergoes small change in refractive index upon moisture absorption and which also suffers only limited optical distortion and polycarbonate resin or aromatic polyester resin.

13. The plastic optical element according to claim 1, wherein a thickness of said lower inorganic layer ranges from 50 nm to 1000 nm.

14. The plastic optical element according to claim 1, further comprising:

an anchor coat formed between said lower inorganic layer and said upper organic layer.

15. The plastic optical element according to claim 1, wherein said plastic optical element is one of an optical lens, eye glasses, contact lenses, a prism, an optical filter, an optical screen, a deflector, a polarizer, a light reflector and a view finder.

* * * * *